April 11, 1950     W. H. HORTON     2,503,738
EXTENSION COLUMN LOCK
Filed Sept. 25, 1947
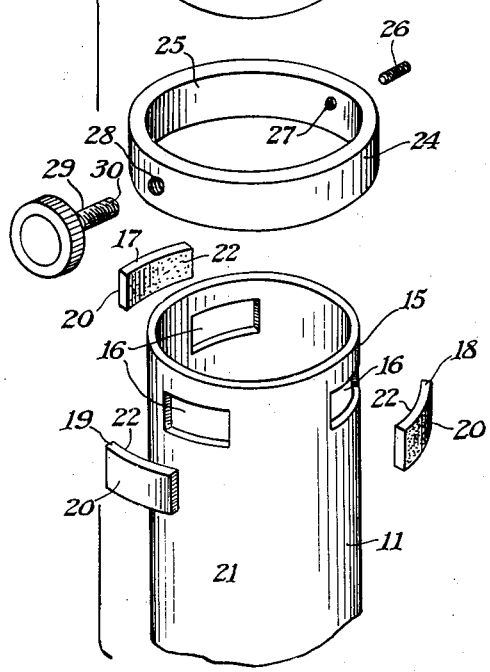
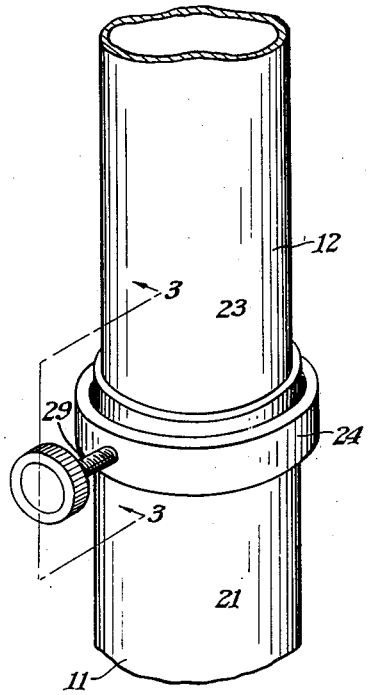
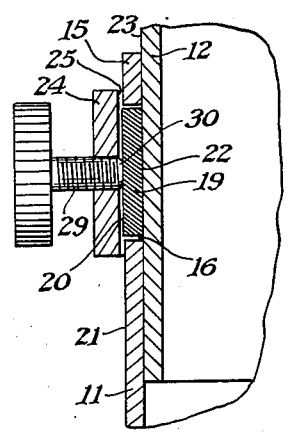
WILLIAM H. HORTON
INVENTOR
BY Newton M. Perrins,
J. Griffin Little
ATTORNEYS Patented Apr. 11, 1950

2,503,738

UNITED STATES PATENT OFFICE 2,503,738

EXTENSION COLUMN LOCK

William H. Horton, Rochester, N. Y., assignor to Eastman Kodak Company, Rochester, N. Y., a corporation of New Jersey Application September 25, 1947, Serial No. 776,041

5 Claims. (Cl. 287—58)

The present invention relates to an extensible column or supporting member comprising a pair of telescoping tubular members, and more particularly to a mechanism for locking or holding the members in any position of adjustment.

The present invention has, therefore, as its principal object the provision of a lock for effectively retaining a pair of extensible telescoping tubular members in any position of adjustment.

A further object of the invention is the provision of a lock of the class described which will effectively retain the members in adjusted position, yet may be readily and easily released to permit the members to be moved relatively to another position of adjustment.

Still another object of the invention is a lock of the type referred to which is simple, rugged, easy to operate and positive and effective in its action.

To these and other ends, the invention resides in certain improvements and combinations of parts, all as will be hereinafter more fully described, the novel features being pointed out in the claims at the end of the specification.

In the drawings:

Fig. 1 is an exploded view of an extensible column and the locking mechanism therefor, showing the relation of the various parts;

Fig. 2 is a view of the extensible column with the locking mechanism in position thereon; and Fig. 3 is a vertical sectional view through the locking mechanism and taken substantially in line 3—3 of Fig. 2, showing the arrangement for moving the actuating shoe into position to lock the telescoping members.

Similar reference numerals throughout the various views indicate the same parts.

A pair of tubular telescoping cylindrical members 11 and 12 are adapted to cooperate to provide an extensible column or supporting member, the member 11 being the outer member and the member 12 being the inner member. These members may be of any suitable length depending upon the purpose for which they are to be used. When the members are to be adjusted, the inner member is moved or slid axially relative to the outer member, as is apparent. However, when the parts are adjusted, it is necessary to lock or retain the members against accidental or inadvertent axial movement.

To secure this result, the present invention provides a novel and simple locking device which effectively holds or locks the members against relative movement. However, when the adjustment of the members is to be changed, the lock may be readily and easily released to permit the members to be slid in telescopic relation until the desired position is reached, whereupon the lock is again operated to clamp the members together.

In the preferred embodiment of the invention, the outer member 11 is provided, adjacent to the end 15, with a plurality, in the present instance three, axially-aligned and equally spaced peripheral rectangular slots or openings 16 which extend through the wall of the outer member, as clearly shown in Fig. 1. Arcuate shaped shoes 17, 18 and 19 of the shape shown in Fig. 1, are positioned in the slots 16 and are slightly smaller than the latter so that they may be moved radially therein. Also, the shoes have a thickness which is slightly greater than the thickness of the wall of the member 11, the purpose of which arrangement will be later described. The curved outer surface 20 of each shoe is substantially concentric with the outer surface 21 of the outer member 11, while the inner surface 22 of each shoe is substantially concentric with the outer surface 23 of the inner member 12.

A retaining ring 24 overlies the shoes 17, 18 and 19 to retain the latter in the slots 16 and between the inner surface 25 of the ring and the outer surface 23 of the inner member 12, as best shown in Fig. 3. The ring 24 is held in position on the outer member 12 by means of a set screw 26 which extends through an opening 27 in the ring and into contact with the surface 21 of the outer member 11, as is apparent. Thus, the ring 24 not only retains the shoes in the slot 16 but also cooperates with the inner member 12 to retain the shoes in wedging or locking relation with the inner member to lock the members against relative movement, as will be later described.

The shoes 17 and 18 are preferably formed of a suitable plastic material so as not to score or scratch the surface 23 of the inner member, the disadvantage of which will be obvious. The shoe 19 is, however, preferably formed of metal. The ring 24 is formed with a threaded opening 28 adapted to receive an adjusting screw 29, the end 30 of which is adapted to engage the outer surface 20 of the shoe 19 as clearly indicated in Fig. 3.

In adjusting the length of the column or supporting member, the members 11 and 12 are slid axially relative to each other until the desired length has been secured. Then the adjusting nut 29 is screwed in to bring the end 30 into engagement with the shoe 19 to move the latter radially inwardly and into contact with the outer surface 23 of the inner member 12. Further movement of the screw 29 will then serve to shift the inner member 12 radially a slight distance to bring the outer surface 23 thereof into engagement with the inner surfaces 22 of the shoes 17 and 18 to wedge the latter between the outer surface 23 of the inner member 12 and the inner surface 25 of the retaining ring 24. Such wedging serves to clamp or lock the inner member frictionally to the outer member with sufficient force to prevent inadvertent or accidental relative movement of the members. As the adjusting nut 29 is carried by the retaining ring 24, the locking action can be broadly considered as being due to the wedging of the shoes 17, 18, and 19 between the inner member 12 and retaining ring 24. When, however, the column length is to be changed, the nut 29 is backed off to release the clamping relation of the shoes to free the inner member. The latter may then be slid axially in the outer member to a new position of adjustment, whereupon the nut 29 is again screwed in to bring the shoes into clamping relation with the inner member to lock the members effectively against relative axial movement.

While one embodiment of the invention has been disclosed, it is to be understood that the inventive idea may be carried out in a number of ways. This application is, therefore, not to be limited to the precise details disclosed, but is intended to cover all variations and modifications thereof falling within the scope of the appended claims.

I claim:

1. In an extensible column, the combination of a pair of thin telescoping tubular members, the outer of said members being formed with a plurality of axially aligned and peripheral spaced slots, locking shoes positioned loosely in said slots and adapted to engage the inner of said members to lock said members against relative movement, means for retaining said shoes in position in said slots, and a screw carried by said outer member for engaging one of said shoes only to move the latter into engagement with said inner member to shift the latter into locking relation with said shoes.

2. In an extensible column, the combination, of a pair of thin telescoping tubular members, the outer of said members being formed with a plurality of arcuate slots, locking shoes positioned loosely in said slots and adapted to engage the inner of said members to lock said members against relative movement, a ring carried by said outer member to retain said shoes in position in said slots, and a threaded member carried by said ring for moving one of said shoes only toward said inner member to lock the latter against all of said shoes.

3. In an extensible column, the combination, of a pair of telescoping tubular members, the outer of said members being formed with a plurality of axially aligned and peripheral spaced arcuate slots, arcuate locking shoes positioned loosely in said slots and having a thickness greater than said outer member and adapted to engage the inner member to lock said members against relative movement, a ring carried by said outer member and overlying said shoes to retain the latter in said slots, and a threaded member carried by said ring for engaging and moving one only of said shoes into engagement with said inner member to shift the latter to wedge the other shoes between said inner member and said ring so that said other shoes will cooperate with said one shoe to lock the inner member against movement relative to the outer member.

4. In an extensible column, the combination, of a pair of thin cylindrical telescoping tubular members, the outer of said members being formed with a plurality of axially aligned and peripherally spaced arcuate slots extending therethrough, arcuate locking shoes loosely positioned in said slots and having a thickness greater than said outer member, a ring carried by said outer member and engaging the outer surfaces of said shoes to retain the latter in said slots, the inner surfaces of said shoes being substantially concentric with the outer surface of said inner member, and a radially movable screw carried by said ring for moving one of said shoes only radially into contact with said inner member to cause all of said shoes to wedge between said inner member and said ring to lock said inner member to said outer member.

5. In an extensible column, the combination, of a pair of thin cylindrical telescoping tubular members, the outer of said members being formed with a plurality of axially aligned and peripherally spaced arcuate openings extending therethrough, arcuate locking shoes loosely positioned in said openings and having a thickness greater than said outer member, a ring carried by said outer member and engaging the outer surfaces of said shoes to retain the latter in said openings, the inner surfaces of said shoes being substantially concentric with the outer surface of said inner member, a radially movable threaded member carried by said ring for moving only one of said shoes radially into contact with said inner member to cause all of said shoes to wedge between said inner member and said ring to lock said members, and means for retaining said ring in position on said outer member to overlie said shoes.

WILLIAM H. HORTON.

REFERENCES CITED

The following references are of record in the file of this patent:

UNITED STATES PATENTS

| Number | Name | Date |
|---|---|---|
| 836,376 | Fancher | Nov. 20, 1906 |
| 1,295,412 | Baines | Feb. 25, 1919 |
| 1,394,596 | Wohl et al. | Oct. 25, 1921 |
| 1,744,521 | Briese et al. | Jan. 21, 1930 |
| 2,038,806 | Sellar | Apr. 28, 1936 |
| 2,189,644 | Wingard | Feb. 6, 1940 |

FOREIGN PATENTS

| Number | Country | Date |
|---|---|---|
| 251,868 | Germany | Oct. 10, 1912 |